United States Patent [19]
Pittet et al.

[11] Patent Number: 5,706,759
[45] Date of Patent: Jan. 13, 1998

[54] PROCESS FOR DETERMINING EXCITANTS, ATTRACTANTS AND STIMULANTS FOR MEMBERS OF THE PROCAMBRUS CLARKII SPECIES OF THE CLASS CRUSTACEA, AND METHOD FOR EXCITING AND/OR ATTRACTING AND/OR STIMULATING MEMBERS OF THE PROCAMBRUS CLARKII SPECIES OF THE CLASS CRUSTAC

[75] Inventors: Alan Owen Pittet, Keyport, N.J.; Phillip G. Lee, Galveston, Tex.; Jennifer C. Ellis, Tacoma, Wash.; Elizabeth A. McCliment, Galveston, Tex.

[73] Assignees: International Flavors & Fragrances Inc., New York, N.Y.; Board of Regents, The University of Texas System, Austin, Tex.

[21] Appl. No.: 535,737

[22] Filed: Sep. 28, 1995

Related U.S. Application Data

[63] Continuation-in-part of Ser. No. 279,181, Jul. 22, 1994, Pat. No. 5,474,030.
[51] Int. Cl.⁶ .................... A01K 61/00; A01K 63/00
[52] U.S. Cl. .................... 119/207; 119/212; 119/247; 119/210
[58] Field of Search .................... 119/204, 205, 119/207, 210, 212, 245, 267, 477; 424/84; 434/295, 296, 297

[56] References Cited

U.S. PATENT DOCUMENTS 4,078,521  3/1978  Laubier .................... 119/205

FOREIGN PATENT DOCUMENTS

| | | | |
|---|---|---|---|
| 506356 | 3/1976 | Russian Federation | 119/204 |
| 1440442 | 11/1988 | Russian Federation | 119/204 |
| 1526619 | 12/1989 | Russian Federation | 119/204 |
| 1699392 | 12/1991 | Russian Federation | 119/205 |
| 1717034 | 3/1992 | Russian Federation | 119/212 |

OTHER PUBLICATIONS

Harada, et al, *Chemical Abstracts*, vol. 104:68037p (1986), (abstract of *Nippon, Suisan Gakkaishi* 1985, 51(12), pp. 2051–2058.

Mitsui Toatsu Chemicals, Inc., *Chemical Abstracts*, vol. 98:106007w (abstract of Japanese Published Application JP 58/00.857 [83 00.857].

*Primary Examiner*—Todd E. Manahan
*Attorney, Agent, or Firm*—Arthur L. Liberman, Esq.

[57] ABSTRACT

Described is a process for determining excitants, attractants and incitants for members of the *Procambrus clarkii* species of the Class Crustacea. Also described is a method for exciting and/or attracting and/or stimulating members of the *Procambrus clarkii* species of the Class Crustacea using various solutions of molecules including but not limited to N-acetyl-D-Glucosamine which is an epimeric mixture of isomers having the structures:

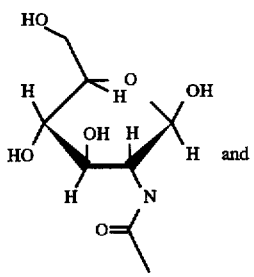

and

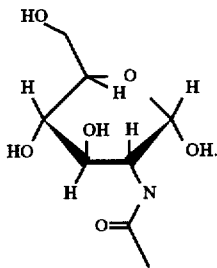

10 Claims, 10 Drawing Sheets

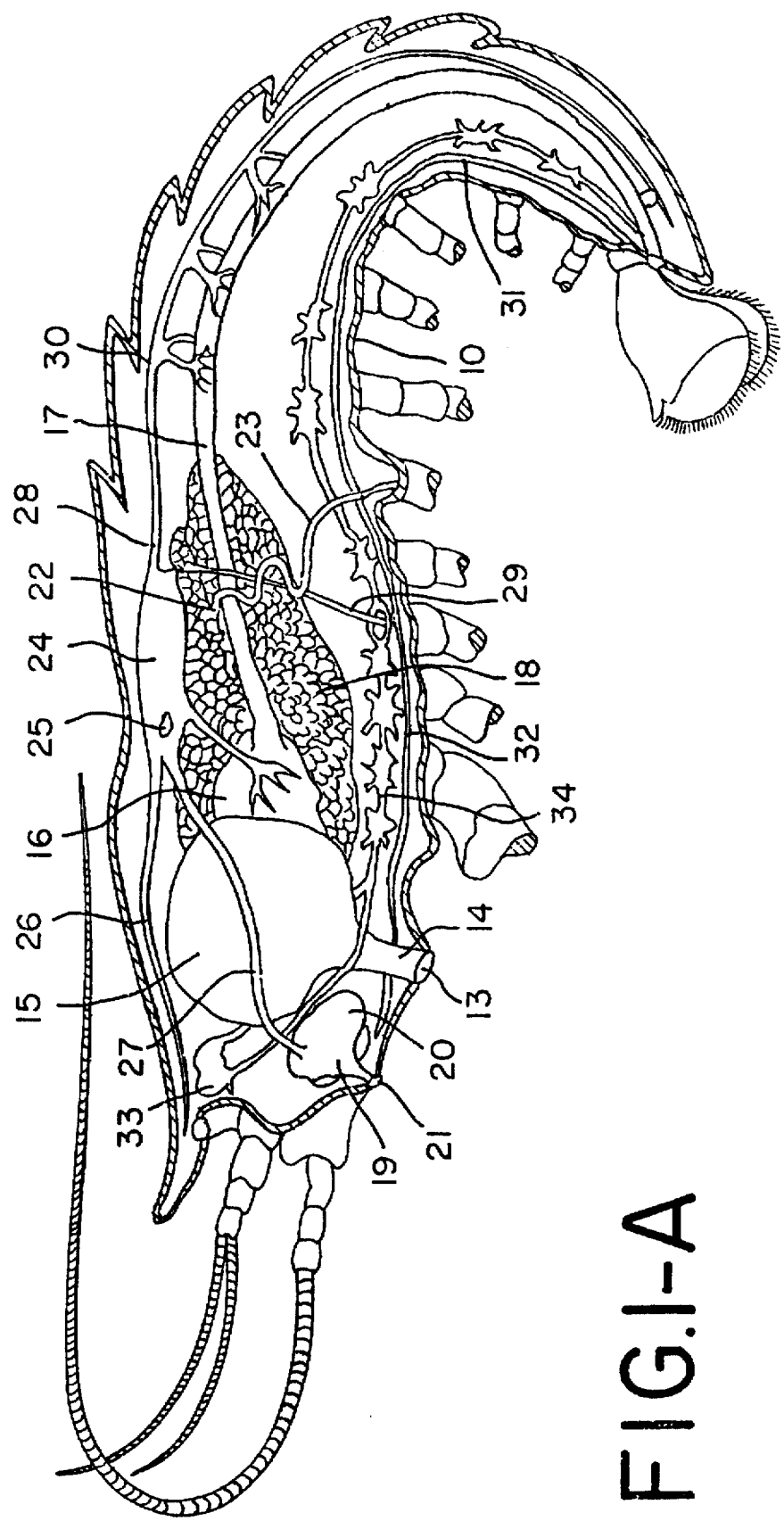
FIG.1-A

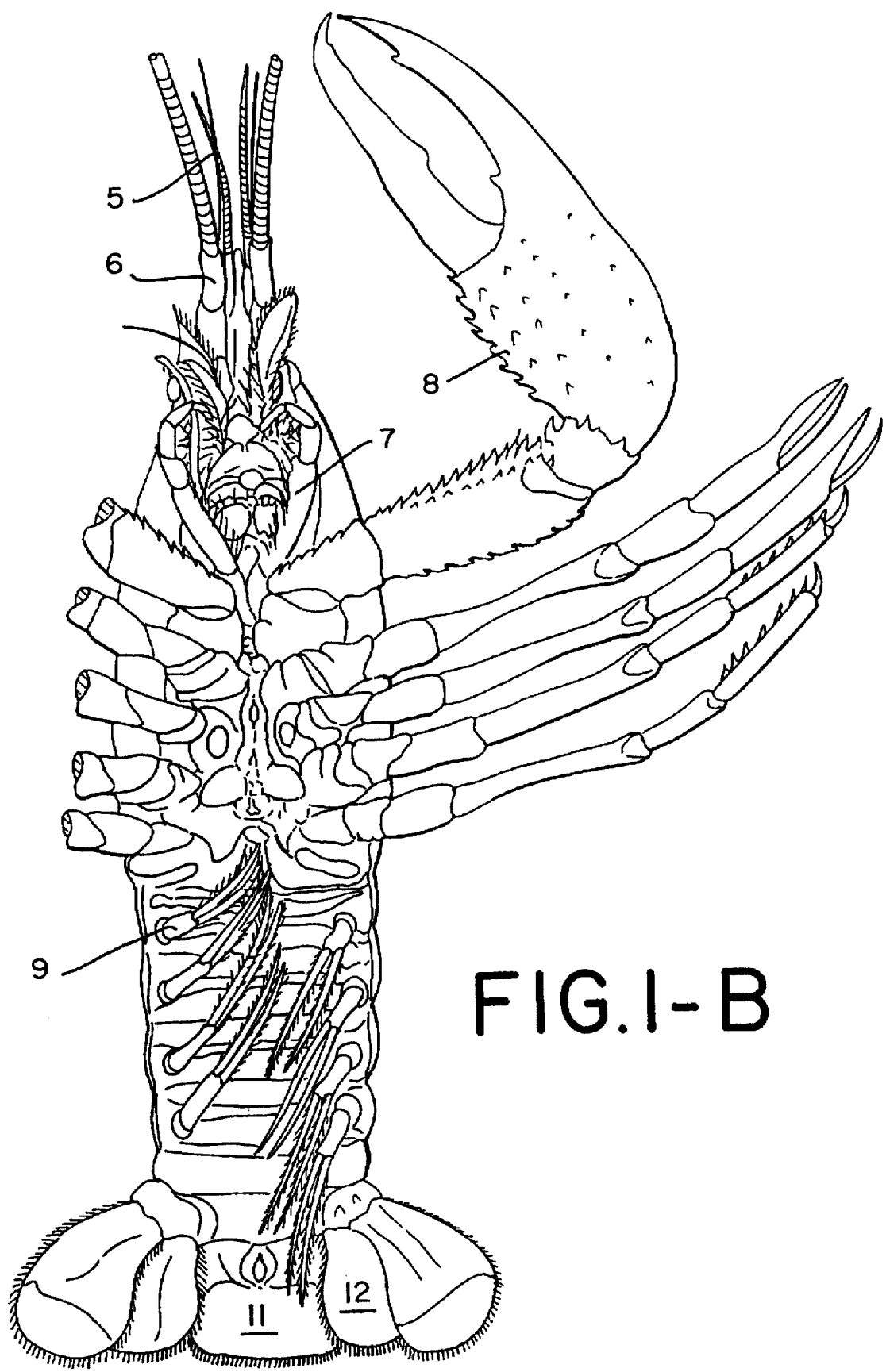
FIG.1-B

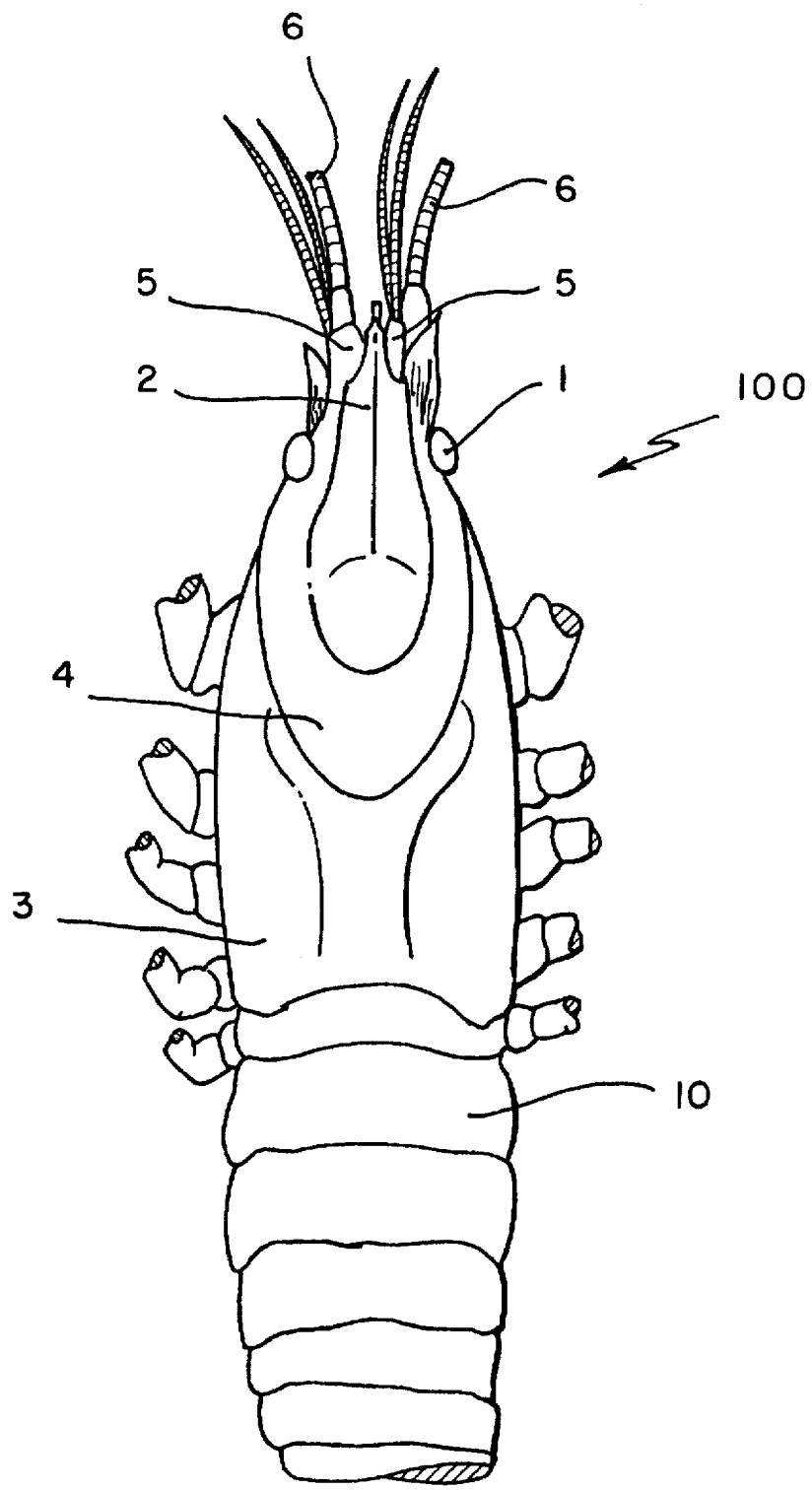
FIG.1-C

PROCESS FOR DETERMINING EXCITANTS, ATTRACTANTS AND STIMULANTS FOR MEMBERS OF THE PROCAMBRUS CLARKII SPECIES OF THE CLASS CRUSTACEA, AND METHOD FOR EXCITING AND/OR ATTRACTING AND/OR STIMULATING MEMBERS OF THE PROCAMBRUS CLARKII SPECIES OF THE CLASS CRUSTAC

RELATED PATENT APPLICATION

This Application is a Continuation-in-Part of application for U.S. Letters Patent, Ser. No. 08/279,181 filed on Jul. 22, 1994, now U.S. Pat. No. 5,474,030.

BACKGROUND OF THE INVENTION

Our invention is drawn to a process for determining excitants, stimulants and attractants for members of the *Procambrus clarkii* species of the Class Crustacea and a method for exciting, stimulating and/or attracting members of the *Procambrus clarkii* species of the Class Crustacea by means of placing within a body of saline water near a surface or throughout the volume to which such Crustacea are desired to be attracted, stimulated and/or excited, a Crustacea attracting, stimulating and/or exciting concentration and quantity of at least one of the substances:

(i) N-acetyl-D-Glucosamine, an epimeric mixture of compounds having the structures:

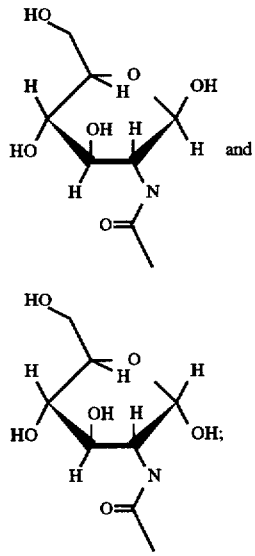

(ii) trimethyl amine oxide hydrate having the structure:

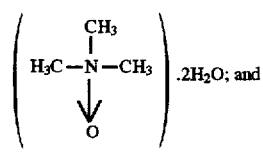

(iii) "raw sugar" (sucrose and "impurities").

Aquatic animals utilize water-borne "chemical signals" (chemical stimuli) to identify and orient toward potential food sources, to escape predators and locate mates. These specific chemical signals are recognized in spite of the chemical complexity of aquatic environments. Therefore, the chemical environment of aquatic animals is vitally important, both physiologically and behaviorally, to understand the status and role of animals in the aquatic environment. The function of specific chemical signals becomes even more significant in a managed biological system (i.e., aquaculture ponds or tanks) that is optimized for production of a single aquatic species (e.g., members of the *Procambrus clarkii* species of the Class Crustacea) since these chemical signals regulate feeding behavior and possibly control reproduction. Because feeds are a significant expense in most aquaculture operations, the need to maximize feeding rates and reduce wasted feed, thereby lowering production costs and the possible lowering of bacterial/viral infections is paramount to economic success.

The importance of chemoattractants and/or feeding stimulants in improving both initial palatability and overall feeding rates as a means to reduce wasted feed is now fully recognized. The feed quality and environmental conditions (i.e., water quality and current patterns) have direct effects on the effectiveness of feed attractants and feed stimulants. For these reasons, food detection and feeding stimulation ultimately determine the commercial value of an aquatic feed.

A number of attempts at obtention of efficacious feeding stimulants for various aquatic species and for creation of appropriate testing apparatus having a high degree of efficiency for determining good stimulants and attractants for aquatic species are set forth in the literature. Thus, U.S. Pat. No. 4,250,835 issued Feb. 17, 1981 and No. 4,249,480 issued Feb. 10, 1981 disclose apparatus and methods for rearing shrimp through the larvae stage wherein the shrimp are subjected to controlled conditions and a common enclosure for the male and female adult shrimp is provided which permits uncontrolled access of the shrimp to one another and wherein the shrimp are maintained through a plurality of cycles of mating, spawning and hatching. The system disclosed provides filtration means for filtering the medium of the common enclosure and with collecting means for harvesting hatched shrimp at preselected times from the common enclosure medium as the medium moves into the filtration means. U.S. Pat. No. 4,828,829 of May 9, 1989 discloses a visual fish attractant that aids in the dispersion of traditional scent and taste attractants. The fish attractant compositions include one or more oils, such as mineral oil, cod liver oil, menhaden oil, herring oil, anise oil, salmon oil, as well as pigments, fragrances, fish scent, dispersed pigments, and light-reflective particles that act both as a visual attractant and as an aid to controlled dispersion of the oil and scent compositions.

Lombardo, et al, *Comp. Biochem. Physiol.*, Vol. 101C, No. 2, pages 389–398, 1992, "Amino Acids and Derivatives as Food-Finding Signals in the Freshwater Snail *Planorbarius corneus* (L.)" discloses the behavioral responses of the freshwater snail to various amino acids including 1-aspartic acid, d-alanine, histamine, proline and aspartame.

Nothing in the prior art, however, discloses the efficient process for attracting, stimulating and/or exciting members of the *Procambrus clarkii* species of the Class Crustacea from or in a volume of water inhabited by said member(s) of the *Procambrus clarkii* species of the Class Crustacea in or to a desired location or volume within a body of water by applying at least one of the specific materials found to be useful in our invention.

THE INVENTION

Accordingly, our invention provides a process for attracting, exciting and/or stimulating at least one member of the *Procambrus clarkii* species of the Class Crustacea from a volume of water or a surface inhabited by said member of the *Procambrus clarkii* species of the Class Crustacea to a desired location or volume within a body of water comprising the step of applying an aqueous saline solution containing a Crustacea-attracting, exciting and/or stimulating concentration of at least one substance selected from the group consisting of:

(i) N-acetyl-D-Glucosamine, an epimeric mixture of compounds having the structures:

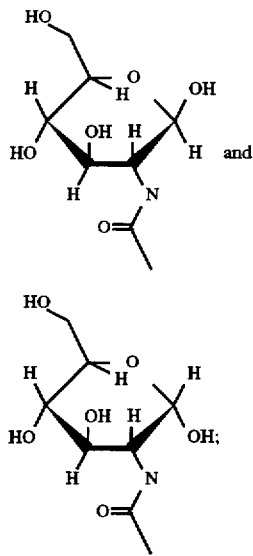

(ii) trimethyl amine oxide hydrate having the structure:

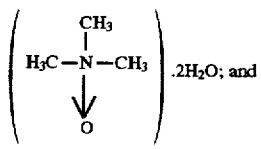

(iii) "raw sugar" (a mixture of sucrose and "impurities").

Each of the substances of our invention tested is diluted in a saline solution containing 30 parts per thousand of a "FRITZ®" Super Salt concentration in water manufactured by the Fritz Chemical Company of Dallas, Tex. 75217. The FRITZ® Super Salt Concentrate contains in major amounts sodium chloride, magnesium sulfate, magnesium chloride and calcium chloride and in minor amounts lithium chloride, sodium molybdate, disodium phosphate, strontium chloride, potassium chloride, sodium bicarbonate, calcium carbonate and magnesium carbonate.

The volume of water for containing a member of the *Procambrus clarkii* species of the Class Crustacea (against which a chemical is to be tested) is a dilute saline solution containing the same concentration of 30 parts per thousand of a FRITZ® Super Salt solution containing the above ingredients.

The amount of attracting, stimulating or exciting chemical such as the trimethyl amine oxide hydrate having the structure:

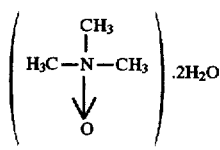

in the salt solution may vary from about $10^{-4}$ gram moles per liter up to about $10^{-21}$ gram moles per liter; and the most preferable concentration range varies from about $10^{-6}$ gram moles per liter down to about $10^{-12}$ gram moles per liter in the saline solution.

We have measured responses on a scale of 0–6 and the measurement of such responses to various concentrations of various attracting, exciting and stimulating chemicals is set forth in detail in the DETAILED DESCRIPTION OF THE DRAWINGS section of the instant Application, infra.

The following results were obtained in the static system of FIG. 2 (described, infra) using the following parameters: all crawfish (*Procambrus clarkii* species of the Class Crustacea) tested had an intact shell and visible head appendages. All were acclimated in the static chamber for 10 minutes and then run for 5 minutes. All positions and movements within the tank were recorded, along with the excitatory responses they exhibited during that time. The following codes were used to record their responses:

A=Antennule flicking;

$AN_2$=Antennae movement;

M=Maxilliped movement;

MP=Mouthpart movement; and

D=Dactyl movement (in the characteristic "feeding" motion).

In the following groups of data, OBS means "Oseola Brown Sugar" manufactured by Osceola Farms Inc. of Pahokee, Fla.; NAG is an epimeric mixture of compounds having the structures:

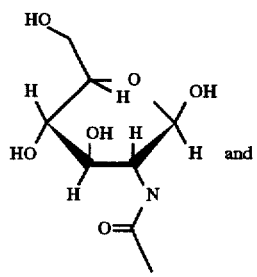

and TMOH is trimethyl amine oxide hydrate having the structure:

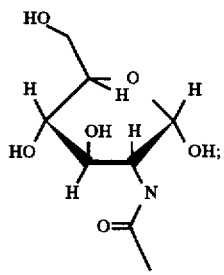

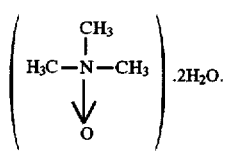

$$\left( \begin{array}{c} CH_3 \\ | \\ H_3C-N-CH_3 \\ \downarrow \\ O \end{array} \right) \cdot 2H_2O.$$

Furthermore, such terms as 10-6 stand for 10-6 gram moles per liter. The "SCORE" is determined as set forth in the DETAILED DESCRIPTION OF THE DRAWINGS section, infra.

| CHEMICAL | CRAWFISH NO. | CODES | SCORE |
|---|---|---|---|
| OBS $10^{-9}$ | 1 | M, A, D | 4 |
| OBS $10^{-9}$ | 2 | A, M, D | 5 |
| OBS $10^{-9}$ | 3 | M, A | 4 |
| OBS $10^{-9}$ | 4 | M, A, D | 5 |
| OBS $10^{-9}$ | 5 | A, M | 3 |
| OBS $10^{-9}$ | 6 | M, A | 5 |
| OBS $10^{-9}$ | 7 | M, A, D | 5 |
| OBS $10^{-9}$ | 8 | A, M | 3.5 |
| OBS $10^{-9}$ | 9 | M, A | 5 |
| OBS $10^{-9}$ | 10 |  | X |
| OBS $10^{-9}$ | 11 | A, M | 5 |
| OBS $10^{-9}$ | 12 | A, M | 4 |
| OBS $10^{-9}$ | 13 | A, $AN_2$, M, D | 5 |

OBS $10^{-9}$ AVERAGE = 4.45

| CHEMICAL | CRAWFISH NO. | CODES | SCORE |
|---|---|---|---|
| OBS $10^{-12}$ | 1 | A, M | 4 |
| OBS $10^{-12}$ | 2 | A, M | 4 |
| OBS $10^{-12}$ | 3 | A, M | 3 |
| OBS $10^{-12}$ | 4 | A, M | 3 |
| OBs $10^{-12}$ | 5 | M, A | 4 |
| OBS $10^{-12}$ | 6 | A, M | 2.5 |
| OBS $10^{-12}$ | 7 | A, M, D | 6* |
| OBS $10^{-12}$ | 8 | A, M | 3 |
| OBS $10^{-12}$ | 9 | M, A | 3 |
| OBS $10^{-12}$ | 10 | A, M | 4 |
| OBS $10^{-12}$ | 11 | A, M, D | 3.5 |
| OBS $10^{-12}$ | 12 | A, M, MP | 4 |

OBS $10^{-12}$ AVERAGE = 3.67
*ANIMAL TOUCHED CHEM TUBE WITH MOUTHPARTS AND/OR CHELIPEDS

| CHEMICAL | CRAWFISH NO. | CODES | SCORE |
|---|---|---|---|
| TMOH $10^{-6}$ | 1 | M, A, MP, D | 5 |
| TMOH $10^{-6}$ | 2 | A, M | 3 |
| TMOH $10^{-6}$ | 3 | A, M, D | 4 |
| TMOH $10^{-6}$ | 4 | M, A | 5 |
| TMOH $10^{-6}$ | 5 | A, M | 4 |
| TMOH $10^{-6}$ | 6 | A | 1 |
| TMOH $10^{-6}$ | 7 | A, M | 3 |
| TMOH $10^{-6}$ | 8 | A, M, $AN_2$ | 3.5 |
| TMOH $10^{-6}$ | 9 |  | 0 |
| TMOH $10^{-6}$ | 10 | M, A, D, MP | 6* |
| TMOH $10^{-6}$ | 11 | A, M | 4 |
| TMOH $10^{-6}$ | 12 | A, M | 4 |

TMOH $10^{-6}$ AVERAGE = 3.54
*ANIMAL TOUCHED CHEM TUBE WITH MOUTHPARTS AND/OR CHELIPEDS

| CHEMICAL | CRAWFISH NO. | CODES | SCORE |
|---|---|---|---|
| TMOH $10^{-12}$ | 1 | M, A, D | 4 |
| TMOH $10^{-12}$ | 2 | A, M | 2.5 |
| TMOH $10^{-12}$ | 3 | A, M, MP | 6* |
| TMOH $10^{-12}$ | 4 | A, M | 2.5 |
| TMOH $10^{-12}$ | 5 | A, M | 2.5 |
| TMOH $10^{-12}$ | 6 | A, M, D | 4 |
| TMOH $10^{-12}$ | 7 | A, M | 3.5 |
| TMOH $10^{-12}$ | 8 | M, $AN_2$ | 3 |
| TMOH $10^{-12}$ | 9 | M, A | 4 |
| TMOH $10^{-12}$ | 10 | A, M | 6* |
| TMOH $10^{-12}$ | 11 | M, $AN_2$, A | 3 |
| TMOH $10^{-12}$ | 12 |  | 0 |

TMOH $10^{-12}$ AVERAGE = 3.42
*ANIMAL TOUCHED CHEM TUBE WITH MOUTHPARTS AND/OR CHELIPEDS

| CHEMICAL | CRAWFISH NO. | CODES | SCORE |
|---|---|---|---|
| BLANK | 1 | A | 2 |
| BLANK | 2 | A, M | 2.5 |
| BLANK | 3 | A, $AN_2$ | 1.5 |
| BLANK | 4 | A, M | 3 |
| BLANK | 5 | M, $AN_2$ | 2.5 |
| BLANK | 6 | A, D | 3 |
| BLANK | 7 | A | 2 |
| BLANK | 8 | $AN_2$, A | 2 |
| BLANK | 9 | M, A | 3.5 |
| BLANK | 10 | M, A | 2.5 |
| BLANK | 11 | A, $AN_2$ | 2.5 |
| BLANK | 12 | M, A | 1.5 |

BLANK AVERAGE = 2.38

| CHEMICAL | CRAWFISH NO. | CODES | SCORE |
|---|---|---|---|
| NAG $10^{-9}$ M | 1 | M, $AN_2$, MP, A | 4 |
| NAG $10^{-9}$ M | 2 | A, M | 3 |
| NAG $10^{-9}$ M | 3 | A, $AN_2$, M | 3 |
| NAG $10^{-9}$ M | 4 | A, M, MP | 5 |
| NAG $10^{-9}$ M | 5 | M, $AN_2$, A | 3 |
| NAG $10^{-9}$ M | 6 | A, $AN_2$, M | 3.5 |
| NAG $10^{-9}$ M | 7 | A, M | 3 |
| NAG $10^{-9}$ M | 8 | D, $AN_2$, A | 4 |
| NAG $10^{-9}$ M | 9 | A, M, D | 3 |
| NAG $10^{-9}$ M | 10 | $AN_2$, A, MP | 3 |
| NAG $10^{-9}$ M | 11 | A, M, D | 3.5 |
| NAG $10^{-9}$ M | 12 | $AN_2$, M, A | 3 |

NAG $10^{-9}$ AVERAGE = 3.42

| CHEMICAL | CRAWFISH NO. | CODES | SCORE |
|---|---|---|---|
| NAG $10^{-12}$ | 1 | A, D, M | 3 |
| NAG $10^{-12}$ | 2 | A, M, $AN_2$, D | 3.5 |
| NAG $10^{-12}$ | 3 | A, MP, D, M | 4 |
| NAG $10^{-12}$ | 4 | $AN_2$, A, M | 3.5 |
| NAG $10^{-12}$ | 5 | A, D, M | 4 |
| NAG $10^{-12}$ | 6 | $AN_2$, A, M | 3.5 |
| NAG $10^{-12}$ | 7 | A | 1 |
| NAG $10^{-12}$ | 8 | A, M | 3 |
| NAG $10^{-12}$ | 9 | M, A | 3 |
| NAG $10^{-12}$ | 10 | A, M, D | 3 |
| NAG $10^{-12}$ | 11 | MP, M, $AN_2$, A | 4 |
| NAG $10^{-12}$ | 12 | A, M, D | 3 |

NAG $10^{-12}$ AVERAGE = 3.21

| CHEMICAL | CRAWFISH NO. | CODES | SCORE |
|---|---|---|---|
| NAG $10^{-18}$ | 1 | A, M | 2.5 |
| NAG $10^{-18}$ | 2 | A, M, D | 3 |
| NAG $10^{-18}$ | 3 | M, A, $AN_2$ | 3 |
| NAG $10^{-18}$ | 4 | A, M | 3 |
| NAG $10^{-18}$ | 5 | M, A, D | 4 |
| NAG $10^{-18}$ | 6 | $AN_2$, A | 2.5 |
| NAG $10^{-18}$ | 7 | M, D, A | 3.5 |
| NAG $10^{-18}$ | 8 | A, M | 2.5 |
| NAG $10^{-18}$ | 9 | A, M | 3 |
| NAG $10^{-18}$ | 10 | A, $AN_2$ | 2 |
| NAG $10^{-18}$ | 11 | A, M, D | 3.5 |
| NAG $10^{-18}$ | 12 | A, MP | 3 |

NAG $10^{-18}$ AVERAGE = 3.17

Additional data is set forth graphically in FIGS. 6, 7 and 8 described in the BRIEF DESCRIPTION OF THE DRAWINGS and DETAILED DESCRIPTION OF THE DRAWINGS sections, infra.

Specific aspects of the testing apparatus used in testing the above chemicals as against the *Procambrus clarkii* species of the Class Crustacea (crawfish) is set forth in the brief description of FIGS. 2 and 3 and in the detailed description of FIGS. 2 and 3, infra, and is further set forth in copending applications for U.S. Letters Patent, Ser. No. 08/279,181 filed on Jul. 22, 1994 and Ser. No. 08/413,440 filed on Mar. 30, 1995, the specifications for which are incorporated herein by reference.

Response as a function of concentration of active chemical, e.g., TMOH, NAG and/or OBS taken alone or in combination is described via a number of different mathematical models which are graphically set forth in FIGS. 6, 7 and 8 described, infra. These mathematical models are set forth as follows:

$$R = 5.0014 - [\log_{10}C]^2(0.0084 + 0.5169e^{+0.45[\log_{10}C]})$$

(for NAG: mean of data);

$$R = 0.7874[-\log_{10}C]^{-3/2} - 0.0001[\log_{10}C]^2 + 3.041$$

(for NAG: median of data);

$$R = 4.6574 + 0.0018[\log_{10}C]^3 + 0.0322[\log_{10}C]^2 + 0.0907[\log_{10}C]$$

(for NAG: for mean of all data points);

$$R = (-6 \times 10^{-4})[\log_{10}C]e^{-0.2569[\log_{10}C]} + 0.0207[\log_{10}C] + 3.5607$$

(for TMOH: mean of data);

$$R = -2.6824 \sinh[0.1\{\log_{10}C\}] - 0.3680[\log_{10}C] + 3.1913$$

(for TMOH: for median of data points);

$$R = (-0.0082)[\log_{10}C]^2 e^{-0.0573[\log_{10}C]} - 0.0066[\log_{10}C]^2 + 6.3210$$

(for OBS: mean of data points); and $$R = (-1.5542 \times 10^4)\{\log_{10}C\}^2 e^{+2.1941[\log_{10}C]} - 0.1613[\log_{10}C]^2 + 11.2387$$

(for OBS: median of data points).

In the foregoing equations, the term "R" is the "response" scored as described, infra; and the term "C" is the concentration of active ingredient, e.g., OBS in the saline solution in gram moles per liter.

BRIEF DESCRIPTION OF THE DRAWINGS

FIG. 1A is a schematic side elevation diagram of the *Procambrus clarkii* (crawfish) species of the Class Crustacea, showing the locations of various chemoreceptors as well as other appendages that are the basis for measurement of excitation, attraction and stimulation of the *Procambrus clarkii* (crawfish) species of the Class Crustacea.

FIG. 1B is a schematic bottom ("ventral") view of the *Procambrus clarkii* (crawfish) species of the Class Crustacea showing the locations of various chemoreceptors as well as other appendages that are the basis for measurement of excitation, attraction and stimulation of the *Procambrus clarkii* (crawfish) species of the Class Crustacea.

FIG. 1C is a schematic top ("dorsal") view of the *Procambrus clarkii* (crawfish) species of the Class Crustacea showing the locations of various chemoreceptors as well as other appendages that are the basis for measurement of excitation, attraction and stimulation of the *Procambrus clarkii* (crawfish) species of the Class Crustacea.

[$\log_{10}C$]

with

[$-\log_{10}C$]

Figure 2:
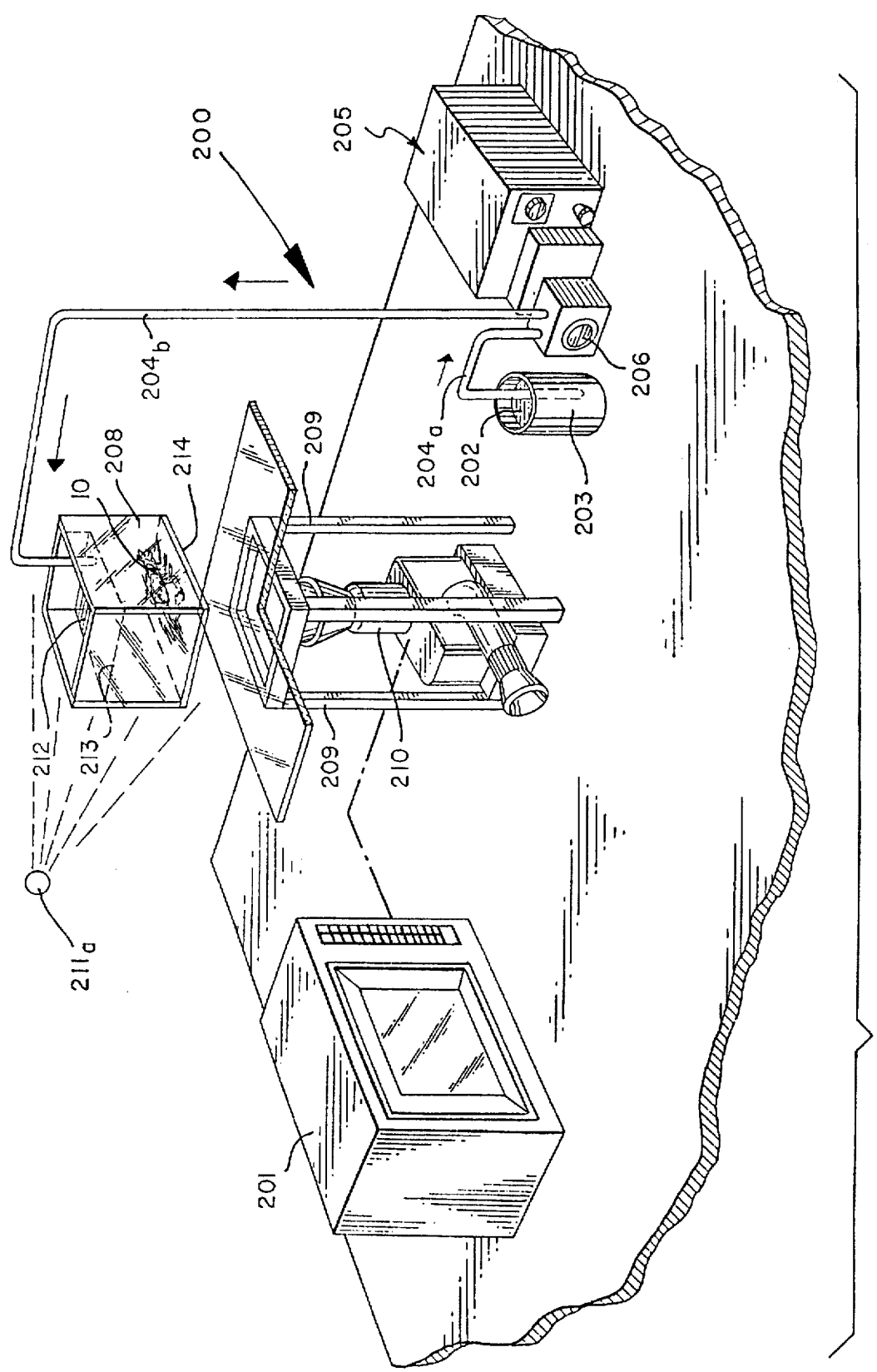
FIG. 2 is a perspective schematic diagram of the static tank testing apparatus useful in our invention showing the interrelationship of the projection device 201 with the video camera or camcorder means 210 useful in practicing our invention.

on the "Y" axis (and "C" being concentration in gram moles per liter) and the response "R" on the "X" axis for the testing of the mixture of compounds having the structures:

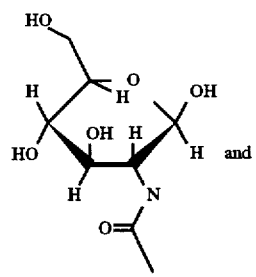

and

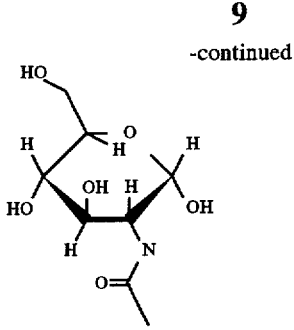

-continued in the static tank testing apparatus (of FIG. 2) as against the *Procambrus clarkii* (crawfish) species of the Class Crustacea. The graph indicated by reference numeral 601 (a "gamma" function) is for the means of responses "R" versus:

$$[-\log_{10}C].$$

The graph indicated by reference numeral 651 (a regression curve) is for the medians of responses "R" versus:

$$[-\log_{10}C]$$

Figure 7:
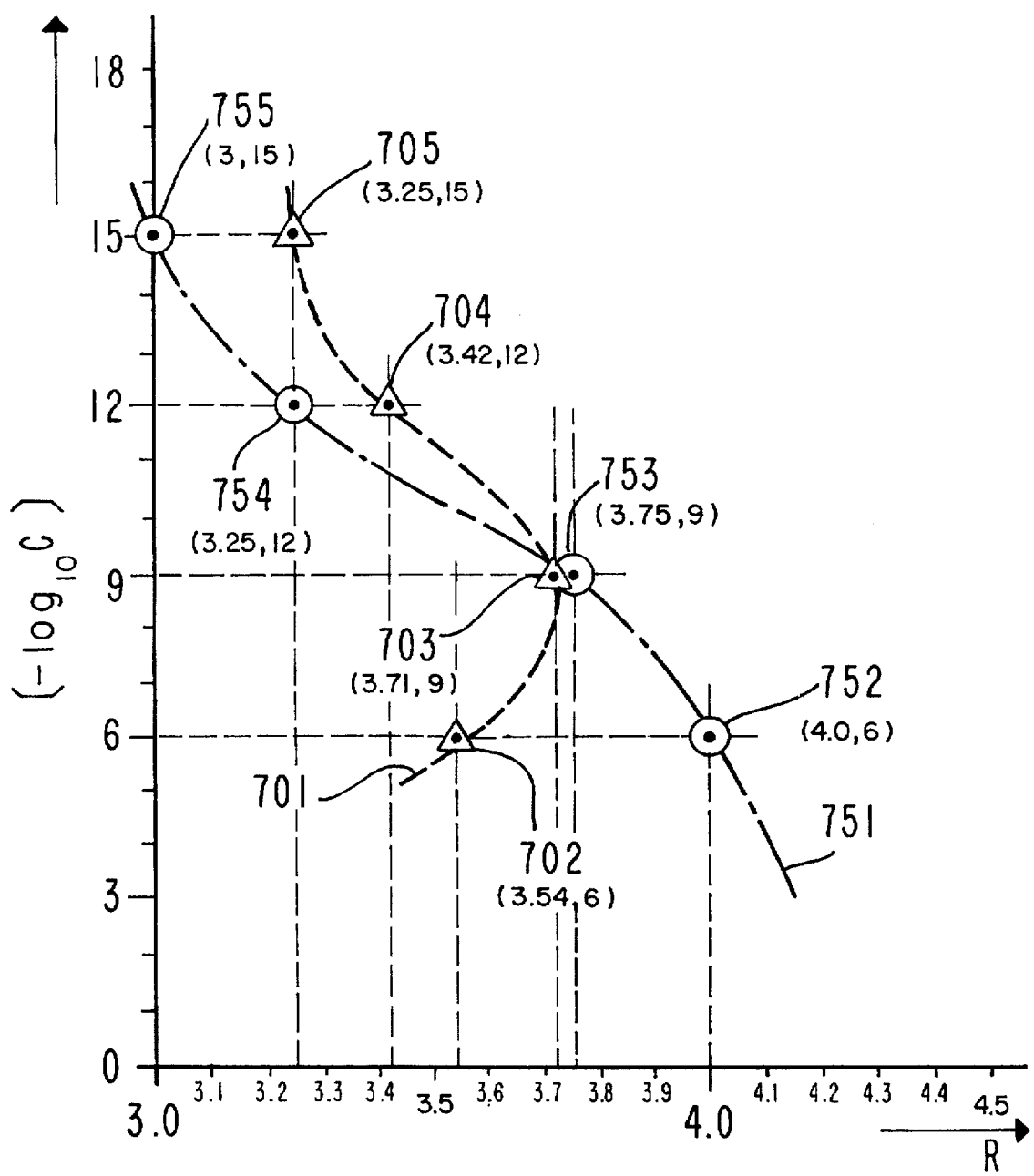

FIG. 7 sets forth two "response as a function of concentration" graphs ("gamma" function and hyperbolic function) of:

$$[-\log_{10}C]$$

versus response "R", with:

$$[-\log_{10}C]$$

being on the "Y" axis (and "C" being concentration in gram moles per liter) and "R" being on the "X" axis for the testing of the substance trimethyl amine oxide hydrate having the structure:

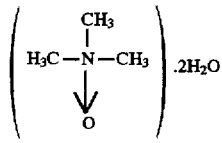

in the static tank testing apparatus of FIG. 2 against *Procambrus clarkii*. The graph indicated by reference numeral 701 (a "gamma" function) is for the means of responses "R" versus:

$$[-\log_{10}C]$$

The graph indicated by reference numeral 751 (a "hyperbolic" function) is for the medians of responses "R" versus:

$$[-\log_{10}C].$$

Figure 8:
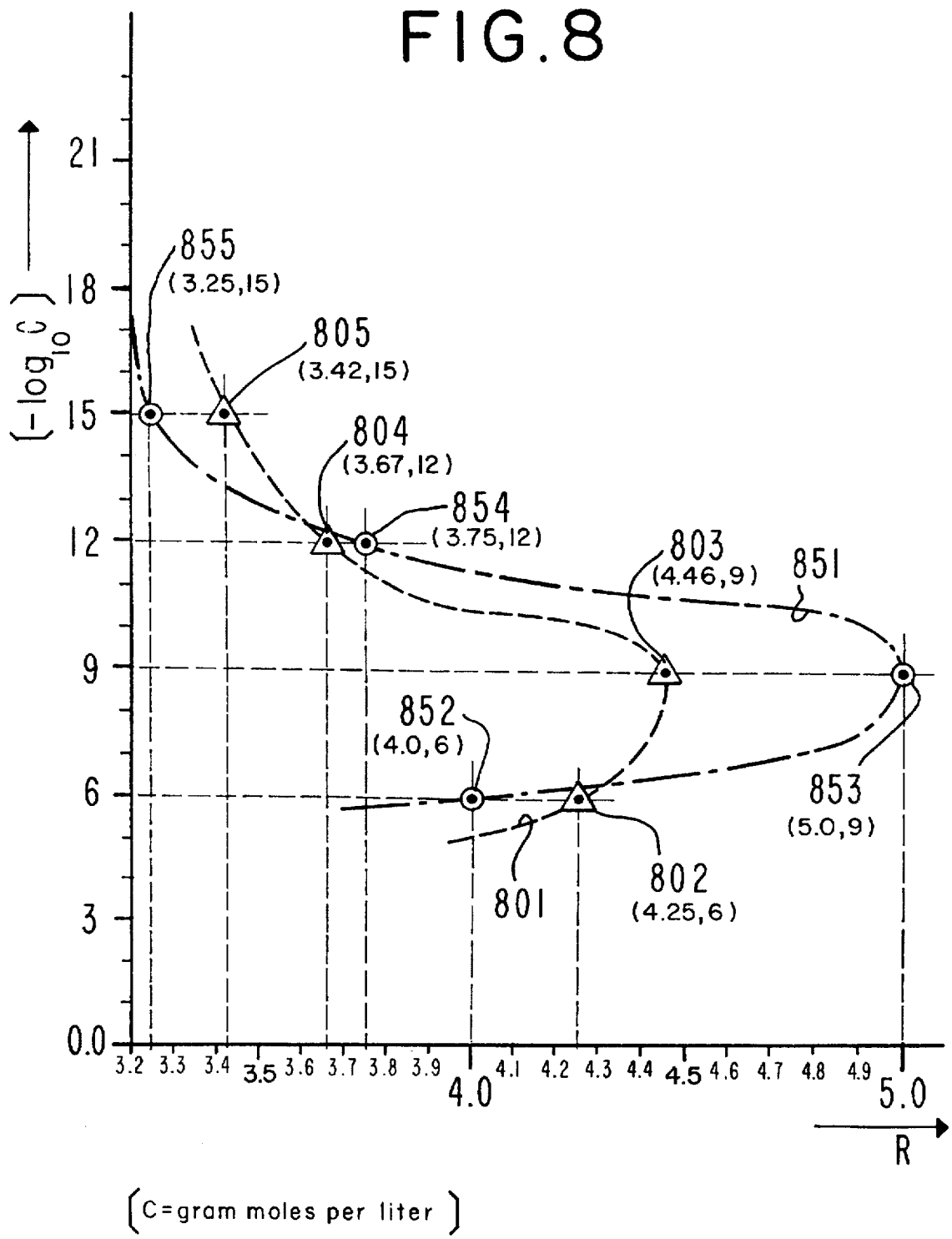

FIG. 8 sets forth "response as a function of concentration" graphs (means of response indicated by reference numeral 801 (a "gamma" function) and medians of response as indicated by reference numeral 851 (also a "gamma" function)) of:

$$[-\log_{10}C]$$

on the "Y" axis versus response "R" on the "X" axis with "C" being in gram moles per liter for the substance Osceola Brown Sugar, manufactured by Osceola Farms Inc. of Pahokee, Fla. (headspace analysis as trapped on TENAX® as set forth in FIG. 5) in the static tank testing apparatus of FIG. 2 as against the *Procambrus clarkii* species of the Class Crustacea.

DETAILED DESCRIPTION OF THE DRAWINGS

Referring to the schematic diagrams of the *Procambrus clarkii* species, FIGS. 1A, 1B and 1C, the *Procambrus clarkii* species is shown by reference numeral 100. FIG. 1A shows the scheme of internal organization of the *Procambrus clarkii* species. FIG. 1B shows a ventral view of the *Procambrus clarkii* species. FIG. 1C shows a dorsal view of the *Procambrus clarkii* species. Reference numeral 1 refers to the compound eye; reference numeral 2 refers to the rostrum; reference numeral 3 refers to the carapace of cephalothorax; reference numeral 4 refers to the cervical groove; reference numeral 5 refers to one of several antennules; reference numeral 6 refers to one of two antennae; reference numeral 7 refers to one of several maxillipeds; reference numeral 7a refers to the one of several dactyls; reference numeral 8 refers to one of several pereiopods (chelipeds); reference numeral 9 refers to one of several pleopods; reference numeral 10 refers to one of several abdominal somites; reference numeral 11 refers to the telson; and reference numeral 12 refers to one of several uropods.

Reference numerals 13, 14, 15, 16, 17 and 18 refer to the digestive system of the *Procambrus clarkii* species of the Class Crustacea. Reference numeral 13 refers to the mouth of the *Procambrus clarkii* species. Reference numeral 14 refers to the esophagus; reference numeral 15 refers to the cardiac stomach; reference numeral 16 refers to the pyloric stomach; reference numeral 17 refers to the intestine; and reference numeral 18 refers to the digestive gland.

Reference numerals 19, 20 and 21 refer to the excretory system of the *Procambrus clarkii* species of the Class Crustacea. Reference numeral 19 refers to the green gland; reference numeral 20 refers to the bladder; and reference numeral 21 refers to the excretory pore.

Reference numerals 22 and 23 refer to the reproductive system of the *Procambrus clarkii* species of the Class Crustacea Reference numeral 22 refers to the testis; reference numeral 23 refers to the sperm duct.

Reference numerals 24, 25, 26, 27, 28, 29, 30, 31, and 32 refer to the circulatory system of the *Procambrus clarkii* species of the Class Crustacea. Reference numeral 24 refers to the heart; reference numeral 25 refers to the ostium; reference numeral 26 refers to the ophthalmic artery anterior aorta; reference numeral 27 refers to the antennary artery; reference numeral 28 refers to the dorsal abdominal artery; reference numeral 29 refers to the sternal artery; reference numeral 30 refers to the segmental artery; reference numeral 31 refers to the ventral abdominal artery; and reference numeral 32 refers to the ventral thoracic artery.

With respect to the nervous system of the *Procambrus clarkii* species of the Class Crustacea, reference numeral 33 refers to the brain; and reference numeral 34 refers to the ventral nerve cord.

In the static tank means of FIG. 2, the following is the established grade protocol with respect to the *Procambrus clarkii* species of the Class Crustacea of FIGS. 1A, 1B and 1C as shown by reference numeral 100:

TABLE I

| Value | Description and Figure Reference Numeral |
|---|---|
| X (not counted and not made part of calculation) | invalid run |
| 0 | no apparent reaction |
| 1 | sporadic maxillary movement (reference numeral 7); no antennule activity (reference numeral 5); and no dactyl movement (reference numeral 7a) |
| 2 | regular maxillary movement (reference numeral 7); no antennule activity (reference numeral 5); and no dactyl movement (reference numeral 7a) |
| 3 | regular maxillary movement (reference numeral 7); sporadic antenule activity (reference numeral 5); and little or no dactyl movement (reference numeral 7a) |
| 4 | continuous maxillary movement (reference numeral 7); sporadic antenule activity (reference numeral 5) ; and sporadic dactyl movement (reference numeral 7a) |
| 5 | continuous maxillary movement (reference numeral 7); extreme antennule activity (reference numeral 5); and regular dactyl movement (reference numeral 7a) |
| 6 | continuous maxillary movement (reference numeral 7); extreme antennule activity (reference numeral 5); regular dactyl movement (reference numeral 7a); and contact between mouthparts and/or chelipeds (reference numeral 8) with chem tube. |

In each of the above descriptions of Table I, the dactyl movement (reference numeral 7a) is defined as the characteristic "picking and feeding" movement described above with the dactyls of the pereipods (reference numeral 7a) are touched to the bottom and then drawn to the mouth.

The *Procambrus clarkii* species (crawfish) of the Class Crustacea possess the characteristic set of crustacean head appendages which include a short pair of antennules (reference numeral 5) and a longer pair of antennae (reference numeral 6 of FIG. 1). Their third maxilliped (reference numeral 7) is enlarged and in close proximity to the mouth (reference numeral 13). The *Procambrus clarkii* species of the Class Crustacea has a highly modified, enlarged first pereiopod (reference numeral 8) with a large chelate dactyl called a cheliped.

Thus, for example, in 12 runs of 9 different animals (the *Procambrus clarkii* species of the Class Crustacea) using a comparison of a fresh water blank to Osceola Brown Sugar, the following responses were noted as positive:

(1) flicking of antennules (reference numeral 5 of FIG. 1). The speed of flicking increased as the chemical was introduced, while the blank runs showed no increase in antennule flicking;

(2) waving of antennules (reference numeral 5) in a dorso-ventral direction;

(3) maxillary movement (reference numeral 7) constant and increased speed during chemical runs;

(4) dacytl movement (reference numeral 7a) in a "grabbing and feeding" manner. Dacytls "pick" at bottom and are then brought to the mouth (reference numeral 13) area. Frequency increased as chemical concentration in the static chamber of FIG. 2 increased and no dactyl movement of this type was seen in the blank runs; and (5) in all chemical runs, animals eventually oriented themselves toward the chemical tube and were seen to move the tube to their mouthparts with the pereiopods (reference numeral 8) and third maxillipeds (reference numeral 7). When the pump was turned off, stopping the chemical flow, the tube was released after approximately one minute (the tube is indicated in FIG. 2 as tube 204b).

Thus referring to the apparatus of FIG. 2, the static testing system, the static tank system is shown by reference numeral 200. Reference numeral 201 refers to the video monitor. Reference numeral 203 is the vessel holding testing solution 202. Testing solution 202 is pumped through line 204a using peristaltic multihead pump 206 controlled by device 205, pumping solution 202 into tank 208. Tank 208 contains liquid 212 in which the *Procambrus clarkii* species of the Class Crustacea is at rest on the bottom of the tank, which bottom is indicated by reference numeral 214 which may be entirely composed of a clear plastic or glass so that the video camera or camcorder 210 may be focused on the movement of the member of the *Procambrus clarkii* species of the Class Crustacea 10 utilizing the fluorescent light-generating device to 211. Tank 208 is mounted on stand 209 which surrounds the video camera or camcorder 210 directed towards the tank 208. The surface of the liquid 212 is shown by reference numeral 213

An example of the light apparatus 211 is a Flexo Heavy-Duty Adjustable Lamp made by Art Specialty Company holding two 18" fluorescent tubes. The tubes are manufactured by the General Electric Company of Schenectady, N.Y. The following specifications for the tubes used are an example of what can be used in the operation of the apparatus of FIG. 2:

GE Catalog No. F15T8/CW;

18" Cool White fluorescent tube;

15 Watt;

Rated life of 7,500 hours;

Initial lumens=825;

Mean lumens=725;

Kelvin temperature=4,150; and

CRI rating of 62.

The peristaltic pumps utilizable are those, for example, identified as MASTERFLEX® L/S manufactured by the Cole-Parmer Instrument Company of 7425 North Oak Park Avenue, Chicago, Ill. 60648 (MASTERFLEX® being a trademark owned by Cole-Parmer Instrument Company). The pump head is a standard pump head. An example of the MASTERFLEX® tubing utilized with the MASTERFLEX® tubing pump (peristaltic pump) is C-FLEX® 06424 (trademark of Cole-Parmer Instrument Company), a styrene-ethylene-butylene modified block copolymer.

Figure 3:
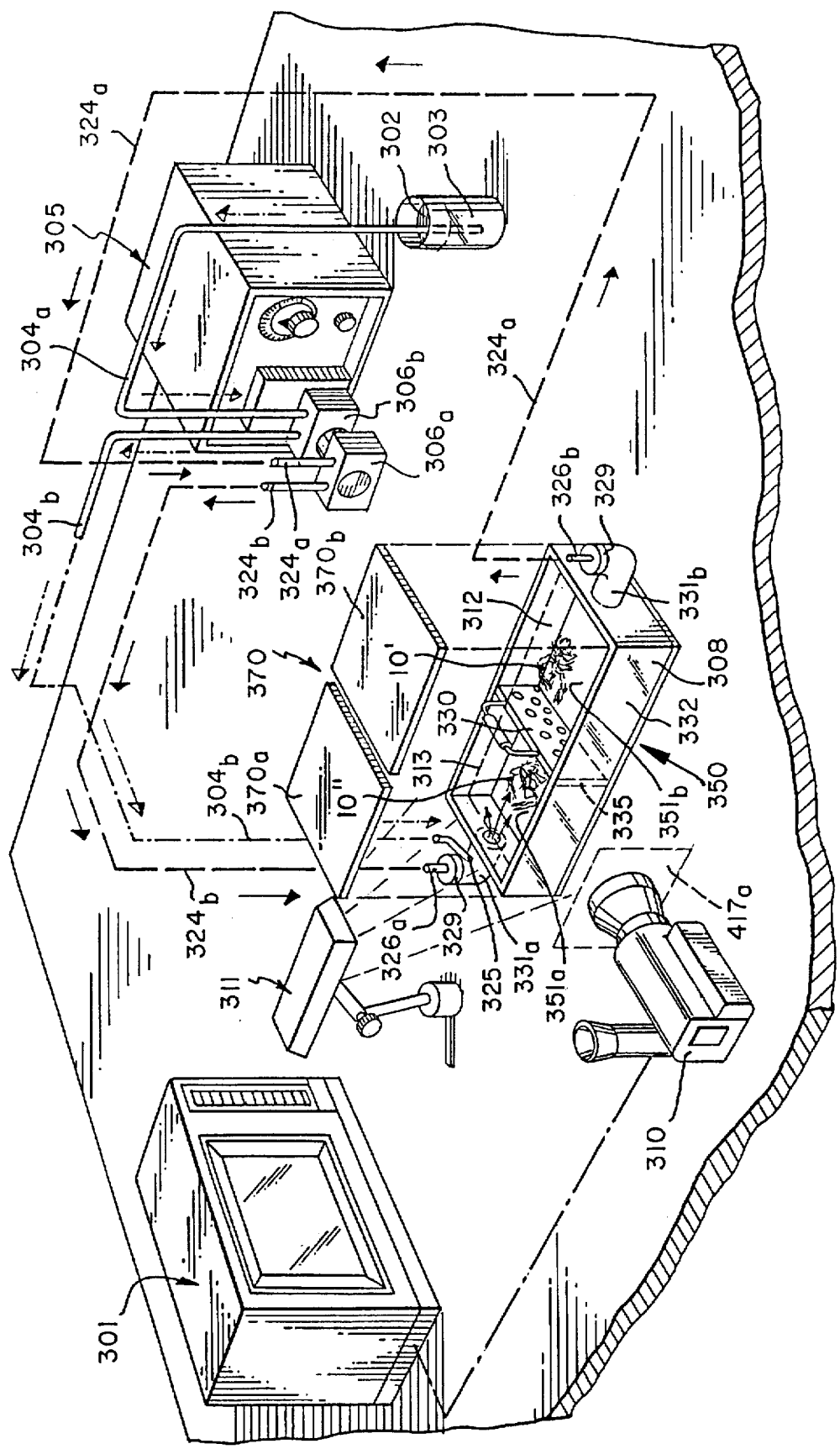
FIG. 3 is a schematic perspective view of apparatus showing the use of the flow-through testing apparatus useful in the practice of our invention.

Referring to FIG. 3, the flow-through vessel testing apparatus which can also be used in testing substances with respect to attraction of the *Procambrus clarkii* species of the Class Crustacea, fluid to be tested 302 is contained in container 303 and pumped through tube 304a using pump 306b and then through tube 304b into location 325 and then into vessel 350. Vessel 350 contains the *Procambrus clarkii* species of the Class Crustacea 10' and 10" located in the flowing liquid 312. Meanwhile, the liquid 312 is circulating by means of pump 306a through line 324a and then through 324b into tube 326a and fitting 331a where it joins with the feeding fluid (test material) at 325. The combined liquids having ever-increasing concentration of material from vessel 303 travels through holding vessel 350 into exit tube 331b past fitting 329 into tube 326b where, again, it is recirculated. The exit portion of the flow-through tank is 351b and the entrance portion is 351a.

The *Procambrus clarkii* animal is placed in section 351b to acclimate with only saline water 312 circulating. The experiment is started by adding liquid (302) to the liquid 312 and removing the barrier 330. The motion of the *Procambrus clarkii* animal 10 from position 10" to 10' is monitored by video camera or camcorder 310 and displayed on display device 301.

Meanwhile, the motions of the member of the *Procambrus clarkii* species of the Class Crustacea 10' and 10" is recorded using video camera or camcorder 310 shown on monitor 301. Simultaneously, light source 311 directs light into flow-through vessel 350. The side of the flow-through vessel has a clear plate through which camera 310 has a direction of vision. Screen 330 is held in place at 335. Screen 330 divides the flow-through tank between sections 351a, the entrance section and 351b, the exit section.

Additional testing fluid enters through tube 304b and enters the elbow, mixing with fluid from 326a at 331a. Fitting 326a is threaded into elbow 325 at 329. Fluid exits entering elbow 331b. Fitting 326b is threaded into the elbow at 329.

Figure 4:
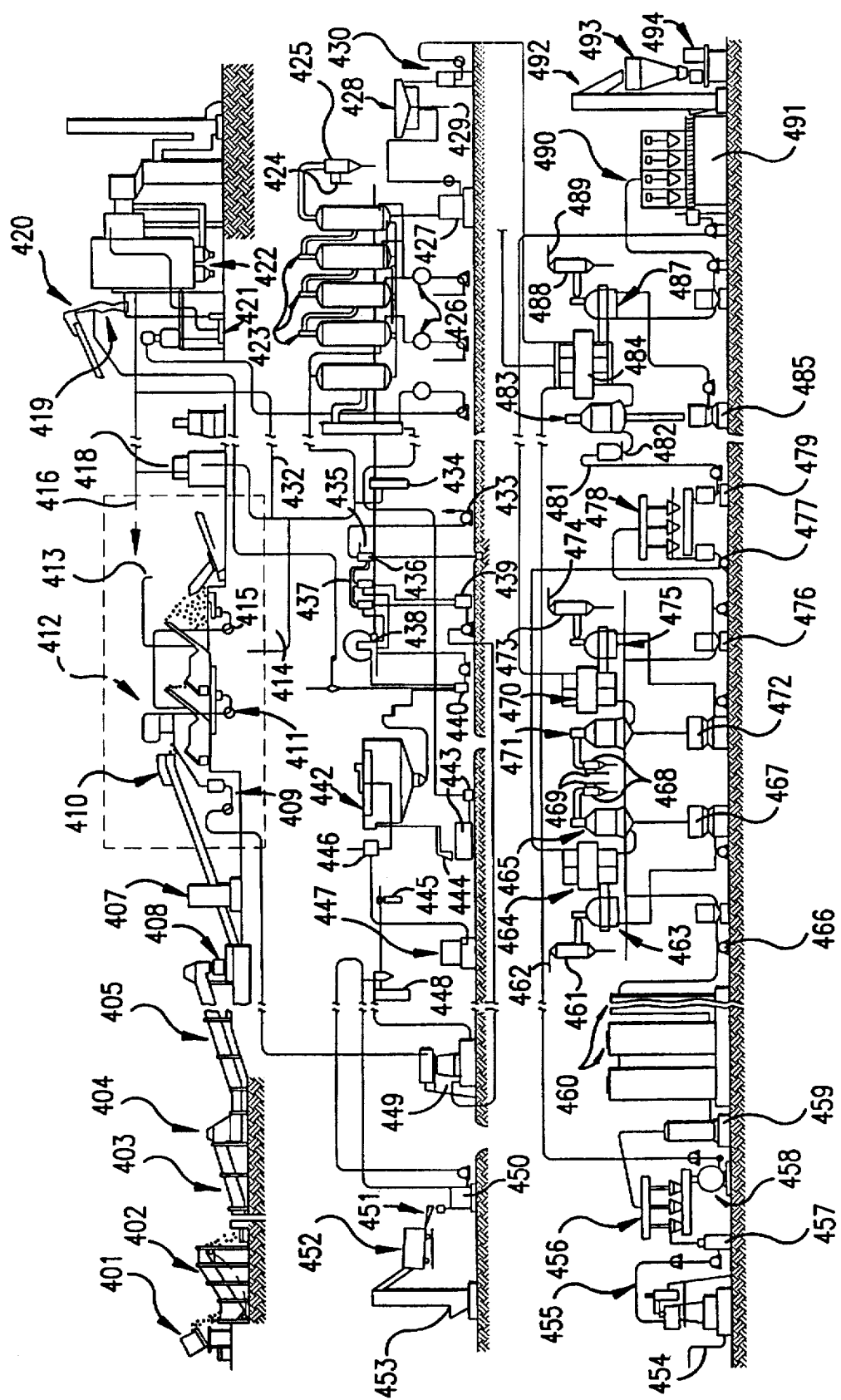
FIG. 4 is a schematic block flow diagram showing production of Osceola Brown Sugar manufactured by Osceola Farms, Inc. of Pahokee, Fla.

Referring to FIG. 4, FIG. 4 sets forth a schematic block flow diagram for the production of Osceola Brown Sugar, produced by Osceola Farms, Inc. of Pahokee, Fla. (the headspace analysis for the Osceola Brown Sugar is set forth in FIG. 5). A cane sugar tipper 401 feeds sugarcane onto a cane feed table 402 whereupon the cane is carried on cane carrier 403 into cane knives 404. The resulting product is carried on cane carrier 405 through heavy duty cane knives and through a shredder 408 into magnetic tramp iron separator 407. The resulting product passes through juice screen 410. The unscreened material, unscreened mixed juice, is passed through the unscreened mixed juice tank and pump 411. The screened material passes through screened juice tank and pumps 409 into juice scale 449. The unscreened material is passed through pressure fed mills 412 and through imbibition juice tank and pump 415. Simultaneously, imbibition water flows out of tube 413. Simultaneously, exhaust steam from the mills and from the shredder 414 is passed through make up station 432 and turbonator sets 418. Boilers 422 are used to process bagasse coming from the bagasse conveying system 419 through bagacillo screen 420, using the deaerater feed tank and pumps 421. Vapor bleed to vacuum pans and heaters is shown by reference numeral 423 with overhead evaporated water 424 being condensed using condenser 425. Condensate from the tanks is collected at 426 and syrup is received at syrup receiver and pumps 427. Syrup is pumped through the syrup clarifier 428 and sediment is collected at 429. Clarified syrup is pumped through line 430 into vacuum pan supply tanks 484.

Simultaneously, lime from source 453 is passed through lime slaker 452 and screened at 451. Milk of lime tanks and pumps 450 passes the resulting product into juice liming tanks 447 where the cane sugar juice is placed from juice heater 448. That juice is passed from juice scale 449. The resulting material is placed into S.R.I. clarifier 442 equipped with flash tank 446. The resulting clarified juice is passed through tank and pumps 443 and then into FS clarified juice heater 434 where it is passed into the vacuum pans and heaters 423. Mud mixer and pump 440 collect sediment from the clarifier 442 and the resulting pump passes material into rotary vacuum filter 438 yielding filtrate from pumps 439 into filtrate receivers 437. Overhead condensate is collected at 435. The condensate is passed through vacuum pump 433.

The Osceola Brown Sugar is obtained from the receiver 482 which is hooked up with magma mixer and pump 479 which receives material from continuous centrifical pumps 478, which in turn receives material from massecuite receiver and pump apparatus 476, which in turn receives material from continuous pan 475 equipped with condenser 473 and overhead water take-off 474. Simultaneously, the seed receiver and pump 485 is pumping material into continuous pan 487 equipped with condenser 488 and water take-off 489. The seed receiver and pump receives material from a seed pan 483 attached to vacuum pan supply tanks 484. The Osceola Brown Sugar received at 482 is received from magma receiver 482 through line 481 hooked up with magma mixer and pump 479. The clarified syrup tank and pumps 430 passes syrup from 430 into the vacuum pan supply tanks 484. Molasses coming from line 454 is stored and that molasses coming from line 454 evolves from the molasses scale and pumps 455 which evolves from molasses run-off tank and pump 457 attached to continuous centrifical pumps 456 working with reheater 459 and meter and pump 458. The reheater 459 is worked continuously with the continuous vertical crystalizers 460 which is hooked up with massecuite receiver and pump 466 associated with continuous pan 463 having attached thereto condenser 461 and water take-off 462. Continuous pan 463 is attached to "C" seed receiver and pump 467 receiving material from seed pan 465 which is hooked up with condensers 468 and water take-off 469. Vacuum supply tanks 464 are hooked up with both the "C" seed pan 465 and the continuous pan 463. The seed pan 465 is also hooked up with condensers 468 and water take-off 469 as is seed pan 471. Seed pan 471 is hooked up with seed receiver and pump 472. Seed pan 471 is also hooked up with vacuum pan supply tanks 470 which in turn is hooked up to molasses run-off tank and pump 477 hooked up in turn with continuous centrifical pumps 478 and magma mixer and pump 479.

Multiple effect evaporator 431 causes the creation of syrup received at 427 which is then pumped into syrup clarifier 428.

The material received from the "B" magma receiver 482 is crystalized and the Osceola Brown Sugar is in fact the crystals received from 482.

Figure 5:
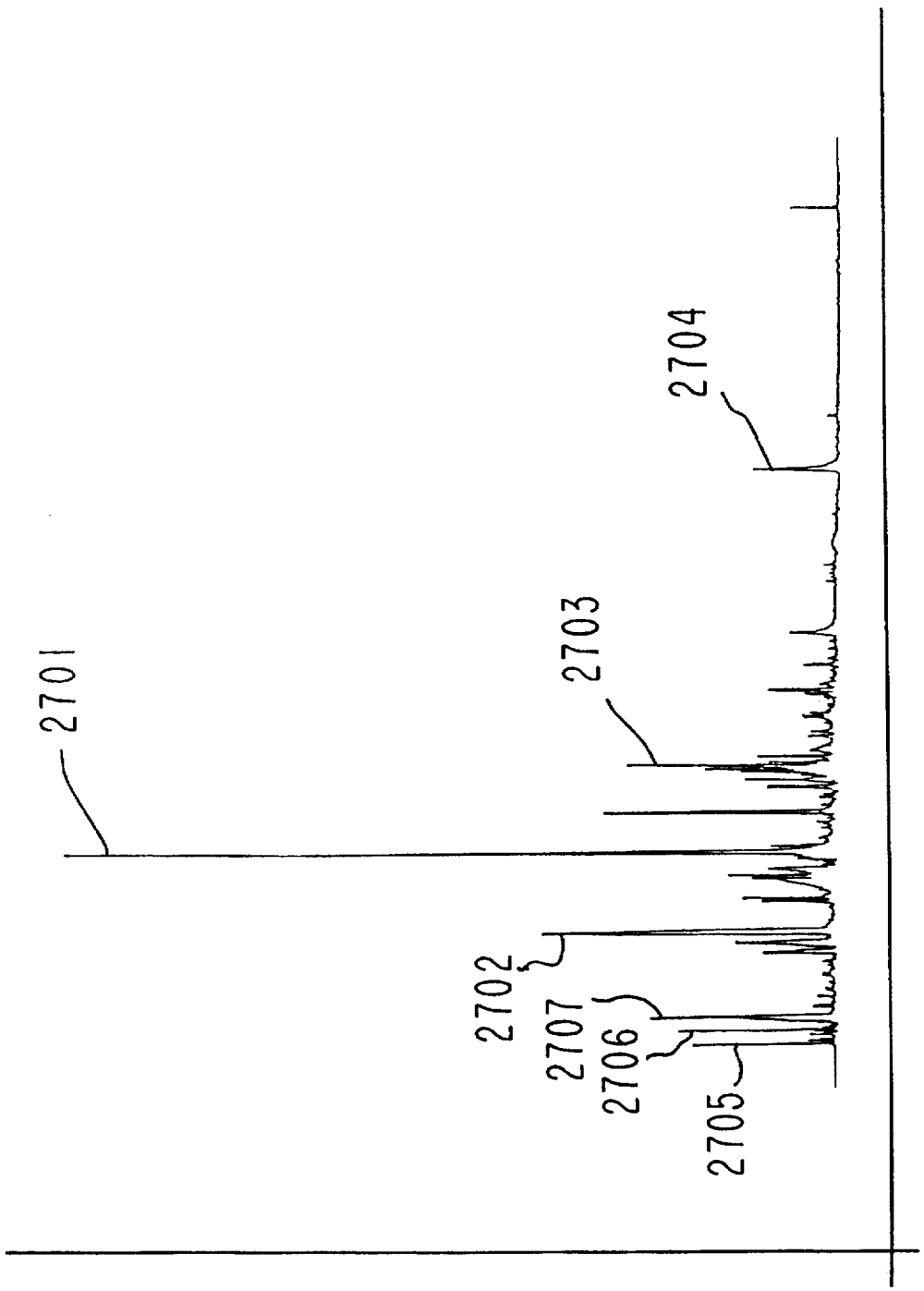
FIG. 5 is a GC profile for the headspace analysis (trapped on TENAX®) for Osceola Brown Sugar manufactured by Osceola Farms, Inc. of Pahokee, Fla.

FIG. 5 is a headspace analysis of substances trapped on TENAX® and is a gas chromatograph for the headspace for the Osceola Brown Sugar produced by Osceola Farms Inc. of Pahokee, Fla. according to the process set forth in the detailed description of FIG. 4, supra.

The peak indicated by reference numeral 2705 is for carbon dioxide. The peak indicated by reference numeral 2706 is for dimethyl sulfide having the structure:

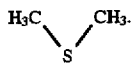

The peak indicated by reference numeral 2707 is for acetic acid having the structure:

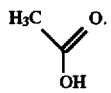

The peak indicated by reference numeral 2702 is for dimethyl sulfoxide having the structure:

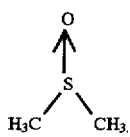

The peak indicated by reference numeral 2701 is for a mixture of 2,3-dimethyl pyrazine and 2,5-dimethyl pyrazine having the structures, respectively:

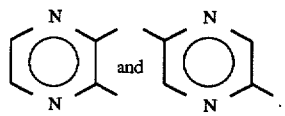

The peak indicated by reference numeral 2703 is for 2,3,5-trimethyl pyrazine having the structure:

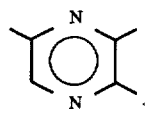

The peak indicated by reference numeral 2704 is for paravinyl guiacol.

Figure 6:
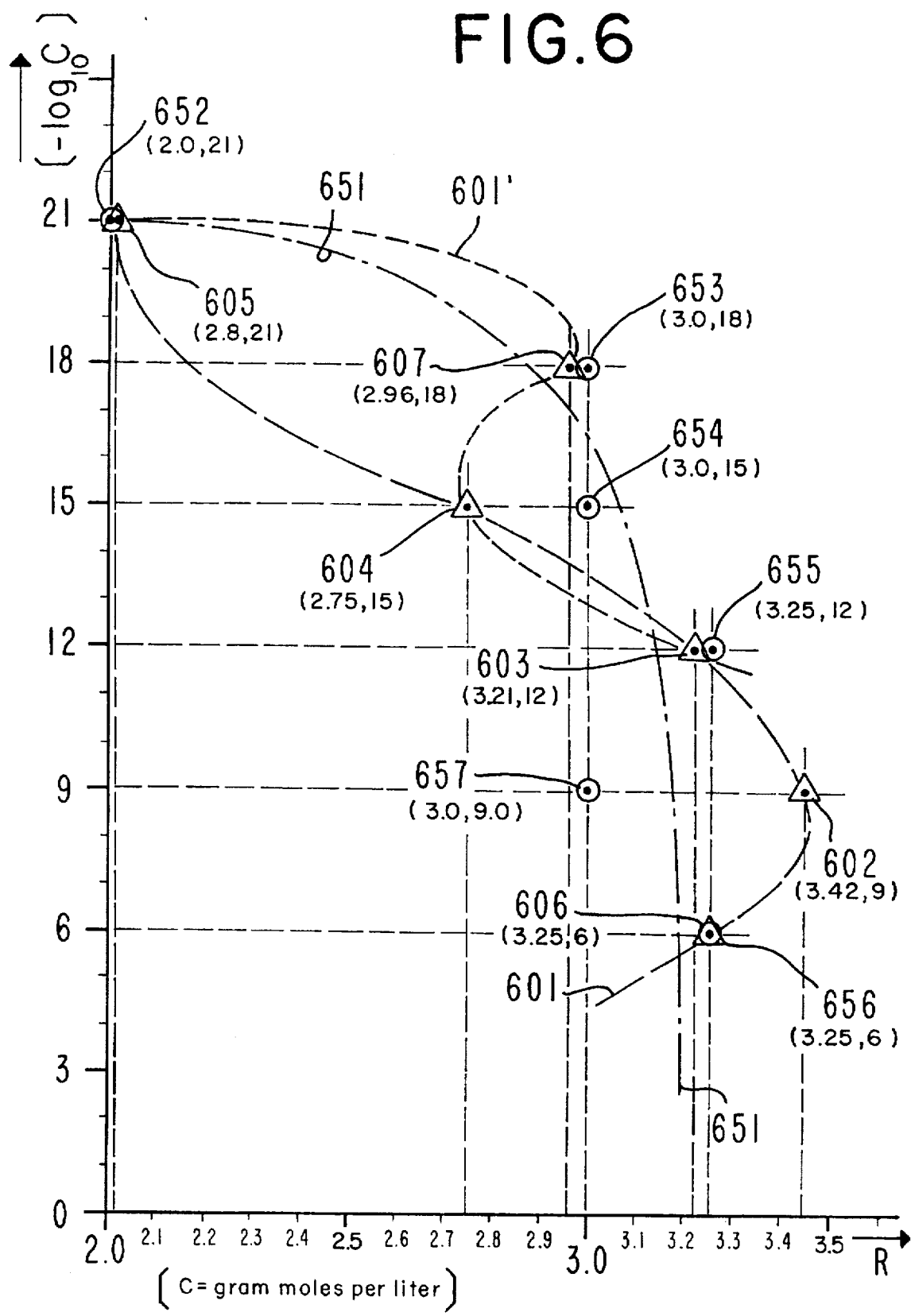
FIG. 6 sets forth two "response as a function of concentration" graphs setting forth data for the response "R" versus.

FIG. 6 sets forth two "response as a function of concentration" graphs setting forth data for the response "R" on the "X" axis versus:

[$-\log_{10}C$]

on the "Y" axis (and "C" being concentration in gram moles per liter) for N-acetyl-D-Glucosamine, an epimeric mixture of compounds having the structures:

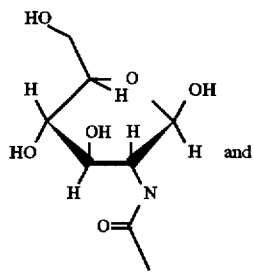

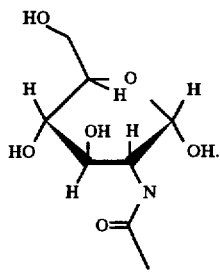

in the static tank testing apparatus of FIG. 2 as against the *Procambrus clarkii* (crawfish) species of the Class Crustacea. The graph indicated by reference numeral 601 (a "gamma" function) is for the means of the responses "R" versus:

[$-\log_{10}C$].

The graph indicated by reference numeral 651 (a regression curve) is for the medians of responses "R" versus:

[$-\log_{10}C$].

The graph indicated by reference numeral 601 is a graph described by the mathematical model:

$$R=5.0014-[\log_{10}C]^2(0.0084+0.5169\ e^{+0.45[\log_{10}C]}).$$

drawn through each of the points which are data points 606, 602, 603, 604 and 605. The graph indicated by reference numeral 651 is a regression curve described by the mathematical model:

$$R=0.7874[-\log_{10}C]^{-3/2}-0.0001[\log_{10}C]^2+3.041$$

and is for the median points, 656, 657, 655, 654, 653 and 652.

With respect to the "mean" line, if point 607 were taken into consideration then a second mean line ("mean line" II) could be drawn described according to the mathematical model:

$$R=4.6574+0.0018[\log_{10}C]^3+0.0322[\log_{10}C]^2+0.0907[\log_{10}C].$$

a cubic equation. The mean line II is indicated by reference numeral 601'.

FIG. 7 sets forth two "response as a function of concentration" graphs ("gamma" function and hyperbolic function) of:

[$-\log_{10}C$]

versus response "R" with:

[$-\log_{10}C$]

being on the "Y" (and "C" being concentration in gram moles per liter) and "R" being on the "X" axis for the testing of the substance trimethyl amine oxide hydrate having the structure:

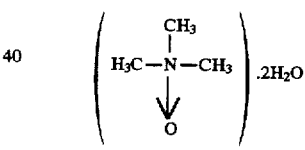

in the static tank testing apparatus of FIG. 2 against the *Procambrus clarkii* species of the Class Crustacea. The graph indicated by reference numeral 701 (a "gamma" function) is for the means of responses "R" versus:

[$-\log_{10}C$]

and is defined by the mathematical model:

$$R=(-6\times10^{-4})[\log_{10}C]e^{-0.2569[\log_{10}C]}+0.0207[\log_{10}C]+3.5607.$$

The graph indicated by reference numeral 751 (a hyperbolic function) is for the medians of responses "R" versus:

[$-\log_{10}C$]

and is defined by the mathematical equation:

$$R=-2.6824\ \sinh[-0.1\{\log_{10}C\}]-0.3680[\log_{10}C]+3.1913$$

The data points for the graph of the means 701 are indicated by reference numerals 702, 703, 704 and 705. The data points for the graph of the medians which graph is indicated by reference numeral 751, are indicated by reference numerals 752, 753, 754 and 755.

FIG. 8 sets forth two "response as a function of concentration" graphs (the means of response graph being indicated by reference numeral 801, a "gamma" function) and the medians of response graph being indicated by reference numeral 851 (also a "gamma" function) of:

$$[-\log_{10}C]$$

on the "Y" axis versus response "R" on the "X" axis with "C" being in gram moles per liter, for the substance, Osceola Brown Sugar manufactured by Osceola Farms Inc. of Pahokee, Fla. (analysis of headspace as trapped on TENAX® is set forth in FIG. 5) in the static tank testing apparatus of FIG. 2 as against the *Procambrus clarkii* species of the Class Crustacea.

The means of response graph indicated by reference numeral 801 is defined according to equation:

$$R=(-0.0082)[\log_{10}C]^2 e^{-0.0573[\log_{10}C]}-0.0066[\log_{10}C]^2+6.3210$$

and is for the data points indicated by reference numerals 802, 803, 804 and 805.

The medians of response graph 851 is defined according to the mathematical model:.

$$R=(-1.5542\times10^4)\{\log_{10}C\}^2 e^{+2.1941[\log_{10}C]}-0.1613[\log_{10}C]^2+11.2387$$

and is for the data points indicated by reference numerals 852, 853, 854 and 852.

What is claimed is:

1. A process for exciting and/or attracting and/or stimulating a member of the *Procambrus clarkii* species of the Class Crustacea within a body of water comprising the step of applying an aqueous solution containing a Crustacea-attracting, stimulating and/or exciting concentration of a material selected from the group consisting of:

(i) N-acetyl-D-Glucosamine, an epimeric mixture of compounds having the structures:

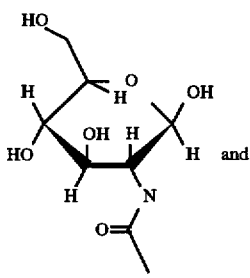

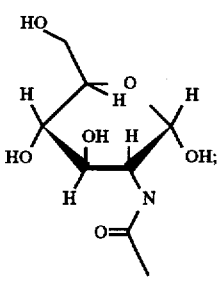

(ii) trimethyl amine oxide hydrate having the structure:

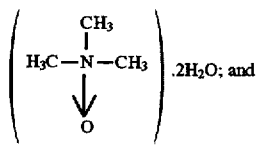

(iii) "raw sugar", a mixture of sucrose and impurities to the vicinity of said desired surface or volume.

2. The process of claim 1 wherein the Crustacean-exciting, attracting and/or stimulating material is N-acetyl-D-Glucosamine, an epimeric mixture of compounds having the structures:

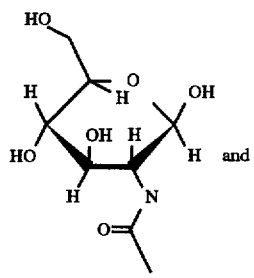

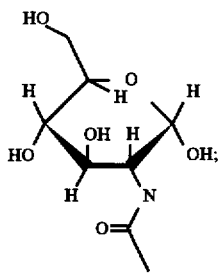

3. The process of claim 1 wherein the Crustacean-exciting, attracting and/or stimulating material is trimethyl amine oxide hydrate having the structure:

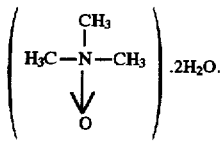

4. The process of claim 1 wherein the Crustacean-exciting, attracting and/or stimulating material is Osceola Brown Sugar.

5. The process of claim 1 wherein the concentration of attracting, stimulating and/or exciting substance in water is in the range of from about $10^{-6}$ down to about $10^{-12}$ gram moles per liter.

6. A process for attracting a member of the *Procambrus clarkii* species of the Class Crustacea from a volume of water inhabited by said member of the Procambrus clarkii species of the Class Crustacea to a desired surface or volume within a body of water comprising the step of applying an aqueous solution containing a Crustacea-attracting concentration of material selected from the group consisting of:

(i) N-acetyl-D-Glucosamine, an epimeric mixture of compounds having the structures:

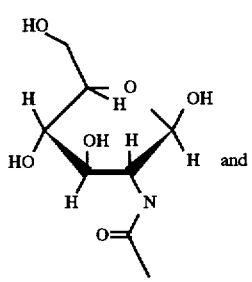

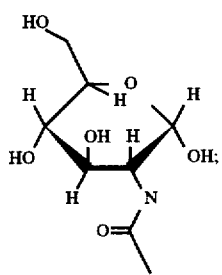

(ii) trimethyl amine oxide hydrate having the structure:

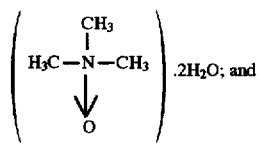

(iii) "raw sugar", a mixture of sucrose and impurities to the vicinity of said desired surface or volume.

7. The process of claim wherein the Crustacean-attracting material is N-acetyl-D-Glucosamine, an epimeric mixture of compounds having the structures:

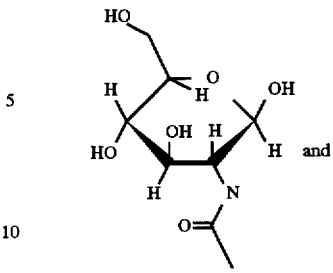

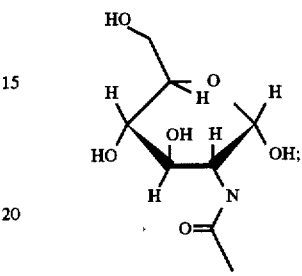

8. The process of claim 6 wherein the Crustacean-attracting material is trimethyl amine oxide hydrate having the structure:

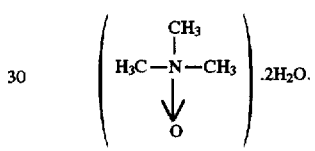

9. The process of claim 6 wherein the Crustacean-attracting material is Osceola Brown Sugar.

10. The process of claim 6 wherein the concentration of attracting substance is in the range of from about $10^{-6}$ down to about $10^{-12}$ gram moles per liter.

* * * * *